US008982663B2

(12) United States Patent
Aaron et al.

(10) Patent No.: US 8,982,663 B2
(45) Date of Patent: Mar. 17, 2015

(54) SUBSURFACE IMAGING SYSTEMS AND METHODS WITH MULTI-SOURCE SURVEY COMPONENT SEGREGATION AND REDETERMINATION

(75) Inventors: Peter Aaron, Katy, TX (US); Stian Hegna, Høvik (NO); Gregory Parkes, Corsham (GB)

(73) Assignee: PGS Geophysical AS, Oslo (NO)

( * ) Notice: Subject to any disclaimer, the term of this patent is extended or adjusted under 35 U.S.C. 154(b) by 564 days.

(21) Appl. No.: 13/269,991

(22) Filed: Oct. 10, 2011

(65) Prior Publication Data
US 2013/0088938 A1    Apr. 11, 2013

(51) Int. Cl.
*G01V 1/38* (2006.01)
*G01V 1/28* (2006.01)

(52) U.S. Cl.
CPC ............ *G01V 1/3861* (2013.01); *G01V 1/3808* (2013.01); *G01V 2210/20* (2013.01)
USPC ................................ 367/23; 181/111; 367/21

(58) Field of Classification Search
CPC .......................... G01V 1/3808; G01V 1/3861
USPC ....................................... 367/21, 23; 181/111
See application file for complete search history.

(56) References Cited

U.S. PATENT DOCUMENTS

| 6,574,567 | B2 | 6/2003 | Martinez |
| 6,882,938 | B2 | 4/2005 | Vaage et al. |
| 7,679,990 | B2 | 3/2010 | Herkenhoff et al. |
| 7,916,576 | B2 * | 3/2011 | Beasley et al. ............. 367/38 |
| 8,339,896 | B2 | 12/2012 | Van Borselen et al. |
| 8,588,025 | B2 * | 11/2013 | Moldoveanu et al. ......... 367/15 |
| 2005/0027454 | A1 * | 2/2005 | Vaage et al. ............... 702/17 |
| 2010/0008184 | A1 | 1/2010 | Hegna et al. |
| 2010/0271904 | A1 * | 10/2010 | Moore et al. ................ 367/73 |
| 2011/0141848 | A1 * | 6/2011 | Beasley et al. ............. 367/38 |
| 2012/0039149 | A1 * | 2/2012 | van Borselen et al. ....... 367/24 |

OTHER PUBLICATIONS

Monk, David J., "Wavefield Separation of Twin Streamer Data", *First Break*, vol. 8, No. 3, Mar. 1990, pp. 96-104.
Posthumus, B. J., "Deghosting Using a Twin Streamer Configuration", *Geophysical Prospecting*, vol. 41, (1993), pp. 267-286.
Egan, Mark et al., "Full Deghosting of OBC Data With Over/Under Source Acquisition", *Society of Exploration Geophysicists, San Antonio Annual Meeting*, (2007), pp. 31-35.
Akerberg, Peeter et al., "Simultaneous Source Separation by Sparse Radon Transform", *Society of Exploration Geophysicists Annual Meeting*, Las Vegas, Nevada, (2008), pp. 2801-2805.

(Continued)

*Primary Examiner* — Ian J Lobo

(57) ABSTRACT

A disclosed subsurface imaging method begins by obtaining initial signals from a geophysical survey that has been acquired with multiple geophysical energy sources actuated in a plurality of firing sequences, each sequence having a known time delay between the firing times of each source. The initial signals are grouped into gathers of signals acquired from multiple firing sequences. For each gather, initial estimates of the first and second source wave fields are determined. Quieted signals for the first source are then generated to represent the initial signals minus a current estimate of the second source wave field. A coherent energy separation operation is applied to the quieted signals to obtain a refined estimate for the first source wave field.

18 Claims, 6 Drawing Sheets

(56) References Cited

OTHER PUBLICATIONS

Spitz, Simon et al., "Simutaneous Source Separation: A Prediction-Subtraction Approach", *Society of Exploration Geophysicists Annual Meeting*, Las Vegas, Nevada, (2008), pp. 2811-2815.

Van Borselen, Roald G., et al., "Methods for Separating Seismic Sources in Marine Seismic Surveys", U.S. Appl. No. 12/806,544, filed Aug. 16, 2010.

Rickert, William T., et al., "Systems and Methods for Wireless Communication in a Geophysical Survey Streamer", U.S. Appl. No. 13/073,832, filed Mar. 28, 2011.

Tenghamn, Stig Rune L., "Systems and Methods for Energy Harvesting in a Geophysical Survey Streamer", U.S. Appl. No. 13/073,823, filed Mar. 28, 2011.

Tenghamn, Stig Rune L., et al., "Digital Sensor Streamers and Applications Thereof", U.S. Appl. No. 13/206,002, filed Aug. 9, 2011.

Barr, Frederick J., et al., "Piezoelectric Sensors for Geophysical Streamers", U.S. Appl. No. 13/209,909, filed Aug. 15, 2011.

Barr, Frederick J., et al., "An Electrostatically Coupled Pressure Sensor", U.S. Appl. No. 13/209,940, filed Aug. 15, 2011.

Boberg, Bengt M., et al., "Quality-Based Steering Methods and Systems for 4D Geophysical Surveys", U.S. Appl. No. 13/216,978, filed Aug. 24, 2011.

\* cited by examiner

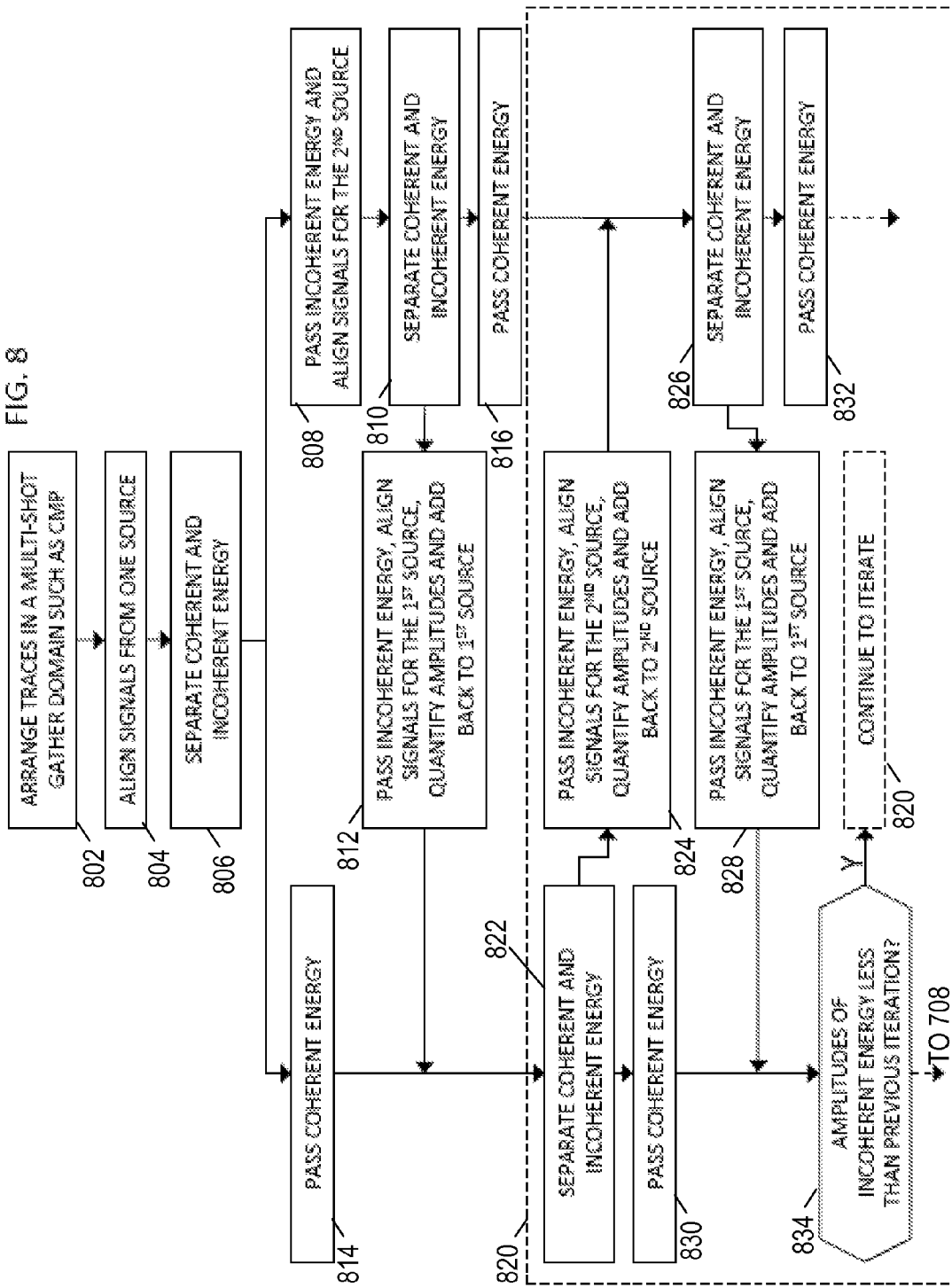

SUBSURFACE IMAGING SYSTEMS AND METHODS WITH MULTI-SOURCE SURVEY COMPONENT SEGREGATION AND REDETERMINATION

BACKGROUND

Seismology is used for exploration, archaeological studies, and engineering projects that require geological information. Exploration seismology provides data that, when used in conjunction with other available geophysical, borehole, and geological data, can provide information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Exploration seismology employs artificially generated seismic waves to map subsurface structures. The seismic waves propagate from a source down into the earth and reflect from boundaries between subsurface structures. Surface receivers detect and record reflected seismic waves for later analysis. Where seismic waves are deemed inadequate, electromagnetic waves may be employed in a related fashion. In both cases, multiple sources can be employed to expedite the survey process by generating overlapping yet separable wave fields.

BRIEF DESCRIPTION OF THE DRAWINGS

A better understanding of the various disclosed embodiments can be obtained when the following detailed description is considered in conjunction with the attached drawings, in which:

FIG. 8 is a flowchart illustrating a source wave-field separation method.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Accordingly there are disclosed herein various subsurface imaging systems and methods that estimate and refine the wave fields for each source in a multi-source survey. In at least some method embodiments, signals are obtained from a geophysical survey acquired with multiple geophysical energy sources actuated in a plurality of firing sequences, each sequence having a known, different time delay between a signal recording start time and a firing time of each source. The survey signals are organized into gathers of signals from multiple firing sequences. Each gather is then processed to form initial estimates of the wave fields for each source, which are then used to provide quieted signals from which refined estimates of the source wave fields can be obtained. A subsurface image can then be derived based on the refined estimates of the component signals.

Figure 1:
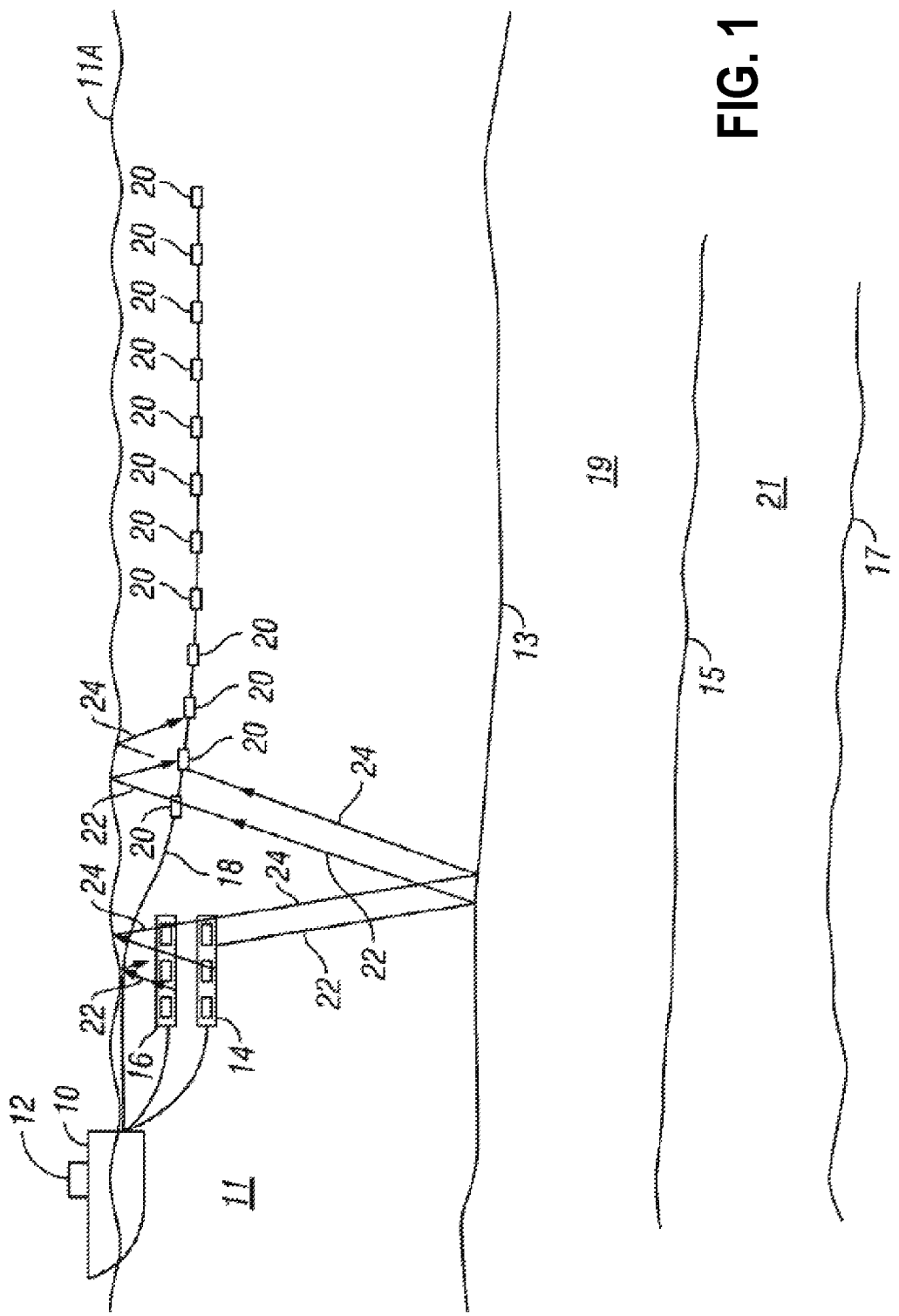
FIGS. 1-2 are views of an illustrative marine geophysical survey system.

FIG. 1 shows an illustrative geophysical survey system that, in this case, collects marine seismic survey data using multiple seismic sources with a variable firing sequence. A seismic survey vessel 10 moves along the surface 11A of a body of water 11 such as a lake or the ocean. The vessel 10 typically includes equipment shown generally at 12 and referred to for convenience as a "recording system". The recording system 12 may include devices for selectively actuating seismic energy sources 14, 16, for actuating and recording the signals generated by the sensors or receivers 20 in response to seismic energy imparted into the water 11 and thereby into rock formations 19, 21 below the water bottom 13, and for determining geodetic position of the vessel 10, the seismic energy sources 14, 16 and each of a plurality of seismic sensors or receivers 20 at any time.

The vessel 10 is shown towing two seismic energy sources 14, 16. The seismic energy sources 14, 16 can be any type of marine energy source including but not limited to air guns and water guns, or arrays of such energy sources. In the illustrative system shown in FIG. 1, the sources 14, 16 are towed at substantially the same distance behind the vessel 10 and at different depths in the water 11. In other examples, the sources 14, 16 may be towed by a different vessel, or may be in a fixed position. Some contemplated systems tow the sources with different vessels, and may further employ more than two sources.

Figure 2:
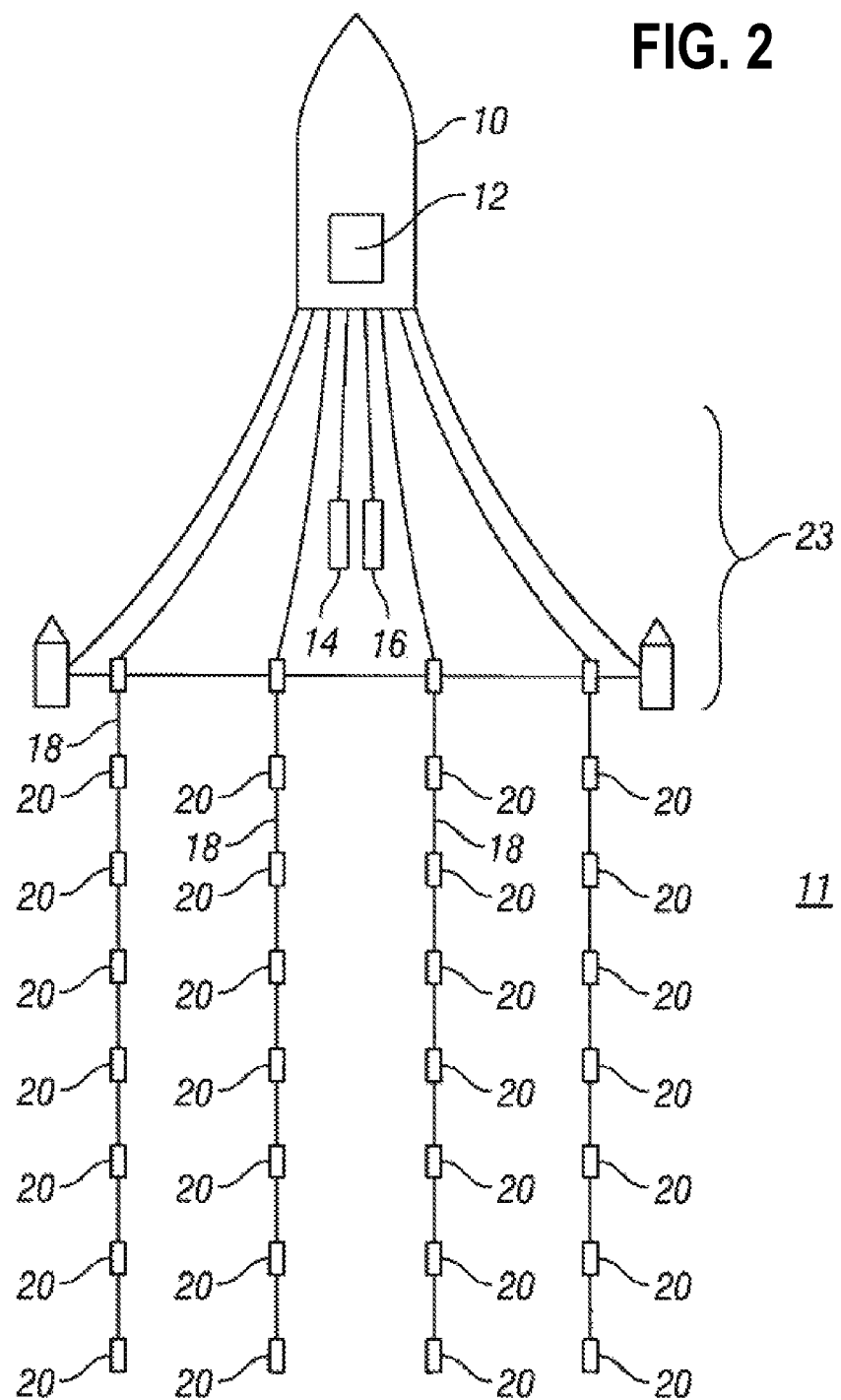

The vessel 10 is also shown towing an array of seismic streamers 18 (see also FIG. 2). The towed-streamer configuration is shown for illustrative purposes. Other suitable sensor array configurations can also be employed including, e.g., ocean bottom cable and borehole-deployed sensors. Any suitable sensors for seismic or other geophysical energy signals can be employed, including but not limited to pressure sensors, pressure time gradient sensors, velocity sensors, accelerometers, and any combination thereof.

During operation, the illustrative geophysical survey system, at selected delay times relative to start of the seismic recording the acquisition system 12, actuates a first one of the seismic energy sources, e.g., source 14. Energy from the first source 14 travels outwardly therefrom as shown at 24. Some of the energy travels downwardly where it is reflected at acoustic impedance boundaries, e.g., the water bottom 13 and at the boundaries 15, 17 between different rock formations 19, 21. Only the water bottom reflections are shown in FIG. 1 for clarity of the illustration. Some of the energy from the first source 14 travels upwardly where it is reflected from the water surface 11A before traveling downwardly and interacting with the formation boundaries as previously described.

The recording system 12 also actuates a second one of the seismic energy sources, e.g., source 16, at selected delay times relative to the start of the seismic data recording, or, alternatively, at selected delay times before or after the actuation of the first source 14. Energy from the second source 16 travels outwardly along similar paths as does the energy from the first source 14, as shown at 22 in FIG. 1. Each actuation of both the first and second seismic energy sources with the above described time delays is referred to herein as a "firing sequence". The time delays vary from firing sequence to firing sequence in a known random, semi-random, or systematic manner. Typically, the time delays are less than one second, but may also be longer. It is also desirable for the time delays for the firing of the sources to be different in each firing sequence. The difference in time delay between firing the first source and the second source should also vary in a known manner which may be random, semi-random or systematic.

FIG. 2 shows the illustrative geophysical survey system of FIG. 1 in plan view to illustrate the towing of a plurality of laterally spaced apart streamers 18. The streamers 18 can be maintained in their relative lateral and longitudinal positions with respect to the vessel 10 using towing equipment 23 of types well known in the art. What is also shown in FIG. 2 is that the first source 14 and the second source 16 can be laterally displaced (and/or longitudinally displaced in other examples) to avoid, in the case the sources 14, 16 are air guns or arrays thereof, having dispersed air in the water 11 from first source 14 affect the seismic energy from the second source 16 and vice versa. Lateral and/or longitudinal displacement is contemplated as being on the order of only a few meters so that the sources 14, 16 provide a spatial energy distribution equivalent to being that which would occur if the sources 14, 16 were in the same vertical plane and at the same longitudinal distance behind the vessel, or expressed differently, at essentially the same geodetic position. By avoiding having dispersed air above the second source 16 when actuated, the effects of the water surface (11A in FIG. 1) will be, adjusted for water depth, substantially the same as the effect thereof on the first source 14.

Figure 3:
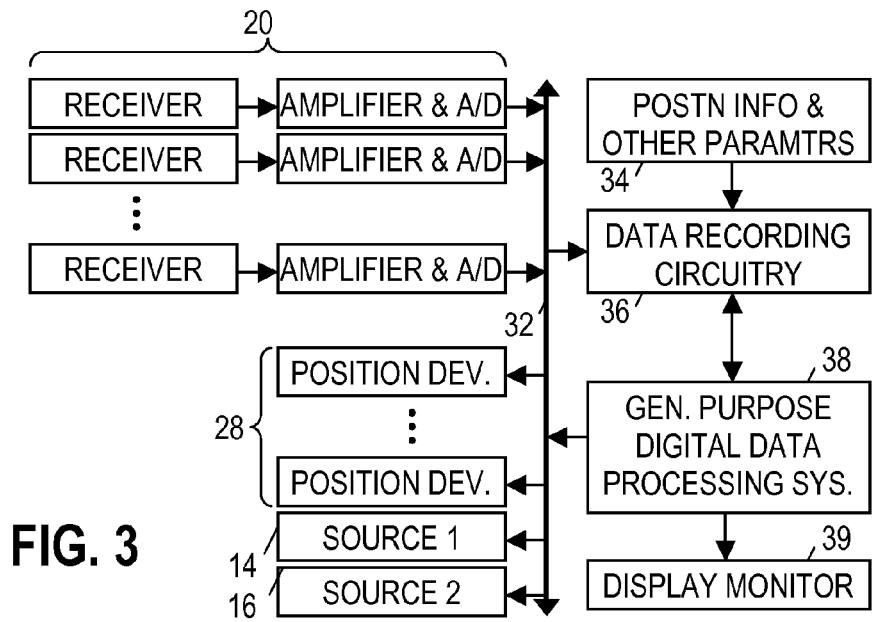
FIG. 3 is a functional block diagram of an illustrative marine geophysical survey system.

A function-block diagram of the illustrative geophysical survey system is shown in FIG. 3. It includes receivers 20 coupled to a bus 32 to communicate digital signals to data recording circuitry 36 on the vessel 10. Position information and other parameter sensors 34 are also coupled to the data recording circuitry 36 to enable the data recording circuitry to store additional information useful for interpreting the recorded data. Illustratively, such additional information may include geodetic position information for the sources and receivers, as well as weather and sea conditions.

A general purpose digital data processing system 38 is shown coupled to the data recording circuitry 36, and is further shown coupled via bus 32 to positioning devices 28 and seismic sources 14, 16. Processing system 38 configures the operation of recording circuitry 36, positioning devices 28, and seismic sources 14, 16. Recording circuitry 36 acquires the high speed data stream(s) from receivers 20 onto a nonvolatile storage medium such as a storage array of optical or magnetic disks or tapes. Positioning devices 28 (including programmable diverters and depth controllers) control the position of receivers 28 and sources 14, 16. The illustrative system further includes a user interface having a graphical display 39 and a keyboard or other mechanism for accepting user input. The user interface enables an operator to monitor and control the operation of the survey system.

The geophysical survey system may include additional components not shown here. For example, each streamer may have an independent bus 32 for coupling to the data recording circuitry 36. Processing system 38 may further include a network interface for communicating stored seismic survey data to a central computing facility having powerful computing resources for processing the seismic survey data, and for receiving subsurface images or other representations of the acquired data from the central computing facility.

The illustrative geophysical system actuates the sources and signal recording as explained above for a plurality of firing sequences while the vessel 10, sources 14, 16 and streamers 18 move through the water 11. The signal recordings made for each firing sequence by the recording system 12 may be referred to as a "shot record" or a "shot gather", and each such shot record will include, for each receiver 20, traces (i.e., received signals) responsive to the seismic energy produced by both the first source 14 and the second source 16.

Figure 4:
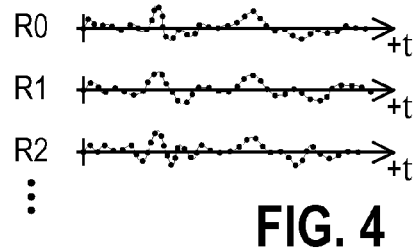
FIG. 4 shows an illustrative set of recorded signals.

FIG. 4 shows illustrative signals (R0, R1, R2, ... ) representative of the signals recorded by the receivers in response to an actuation of the sources. The signals may be digitized signal voltages, but they normally represent some geophysical wave attribute such as pressure, velocity, acceleration, electric field strength, or magnetic field strength. Each signal is associated with the position where the source was fired and the position of the acquiring receiver at the time the source was fired. In other words, each recorded trace has at least three aspects: a source position (for each source), a receiver position, and a time-based signal waveform. From these three aspects, a great wealth of information can be derived.

Figure 5:
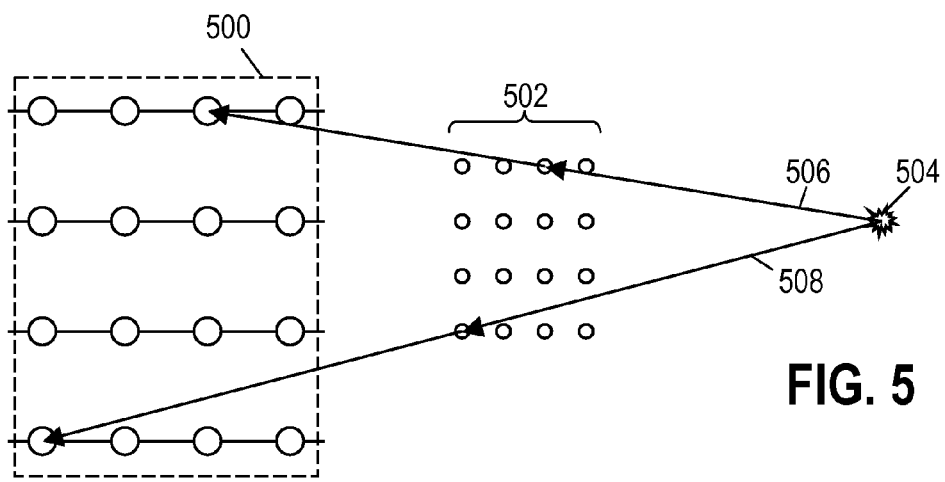
FIG. 5 shows an illustrative midpoint pattern provided by a given source-receiver geometry.

FIG. 5 shows an overhead view of the positions 500 of a set of receivers at the time a source is triggered at position 504. If the subsurface formation layers are largely horizontal, the seismic energy that reaches the receivers does so by reflecting from a point about midway between the source and receiver positions. Thus, if a ray is traced from the source to each receiver (e.g., rays 506, 508), the midpoints 502 of those rays represent the approximate position of the reflections that resulted in the recorded signal waveform. With this understanding, it becomes possible to convert the time-based signal waveforms to depth-based signal waveforms using a pre-existing or a derived velocity model.

Each firing of a source results in a pattern of midpoints 502 associated with the received signals. (The midpoint pattern for each firing is a half-scale replica of the receiver position pattern.) As the survey proceeds, the sources are fired repeatedly and the receivers acquire signals associated with new sets of midpoints that largely overlap previous sets of midpoints. All of the depth-based waveforms associated with a given midpoint can be added or "stacked" to increase their signal-to-noise ratio and provide a more accurate picture of the subsurface structure at that point.

Systems and methods that employ this processing approach typically group the received signals according to their midpoints, thereby forming "common midpoint gathers" or "CMP gathers". Of course other processing approaches are known and employed for converting received signals to subsurface images. Such other approaches may employ other signal groupings such as, e.g., shot gathers, common receiver position gathers a.k.a. "common station" gathers, and common offset gathers a.k.a. common channel gathers. Except for shot gathers, these various types of gathers group together signal from different firing sequences.

Figure 6A:
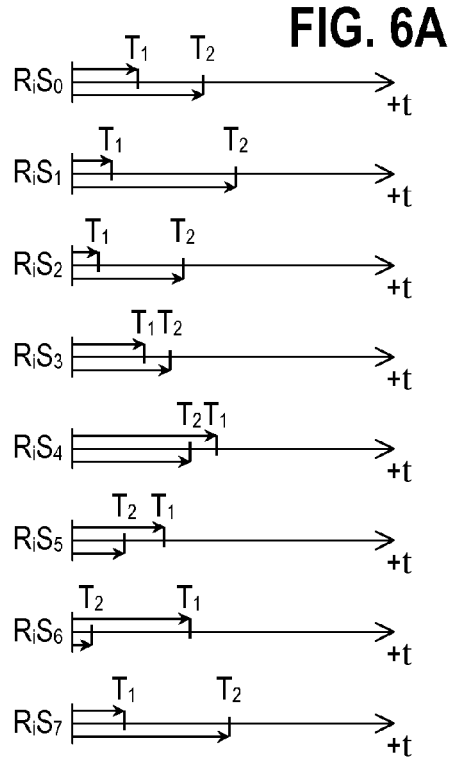
FIGS. 6A-6B show illustrative firing sequences, before and after alignment.
Figure 6B:
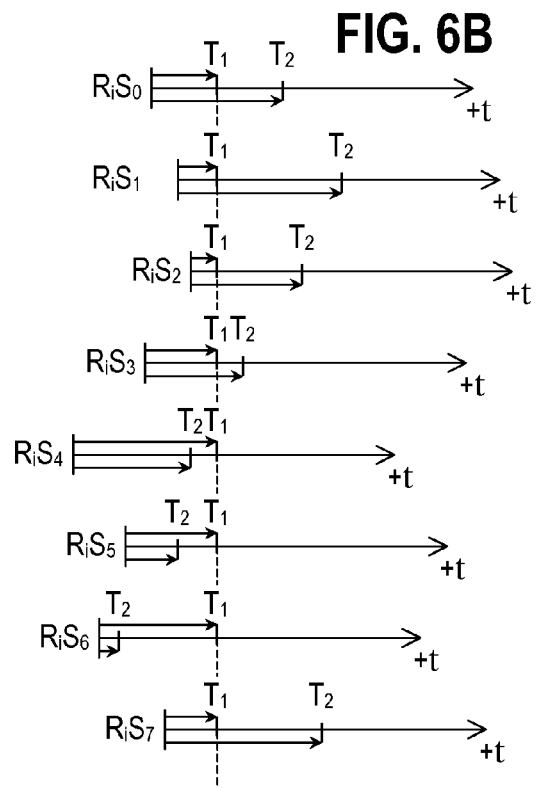

FIG. 6A shows an illustrative set of timelines for signals that might be associated with a common channel gather having signals from different firing sequences. The timelines are labeled RiSj, where i is a given receiver number and j is a given firing sequence number. The timelines each begin at the recording start time and show a firing time T1 for a first source and a firing time T2 for a second source. The delay between the firing times varies so that when the signals are processed to align the firing times of a given source (as indicated in FIG. 6B), the actuation times of the other source remain uncorrelated. This timing of the firing sequences makes it possible to separate the wave fields of each source when processing the signals as outlined below.

Figure 7:
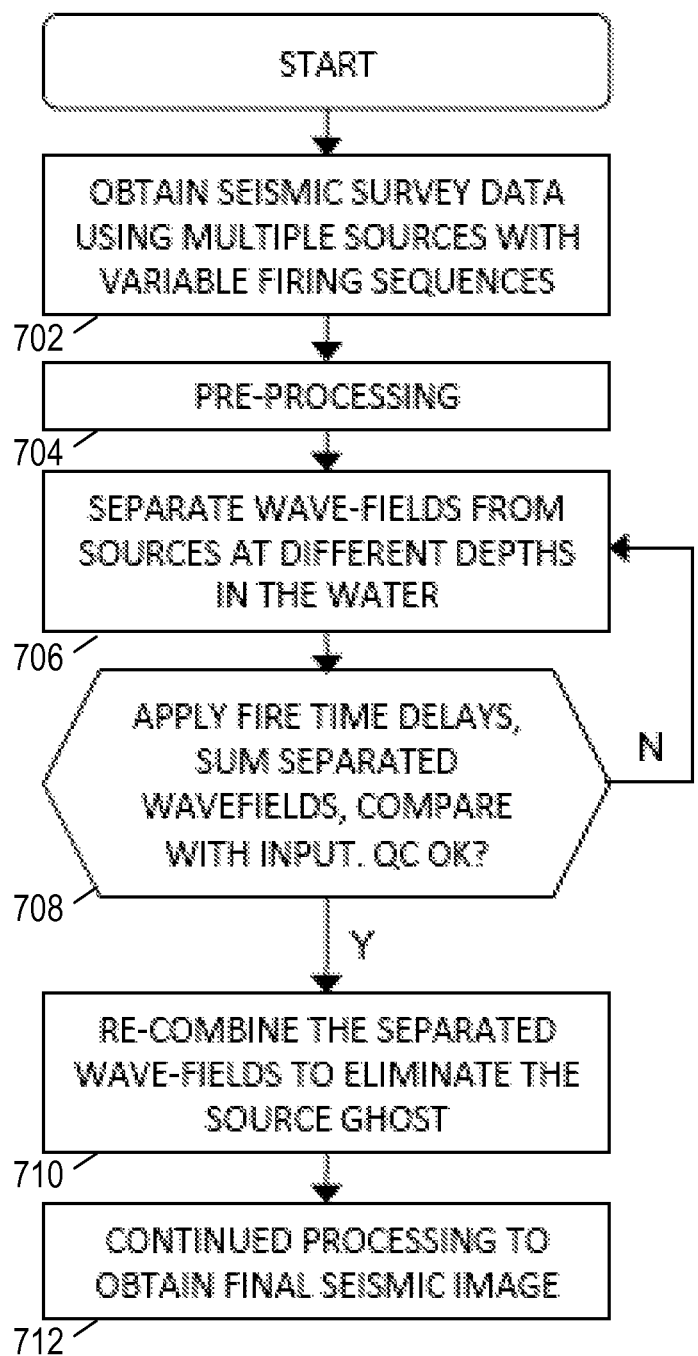
FIG. 7 is a flowchart for an illustrative imaging method.

FIG. 7 is a flowchart of an illustrative subsurface imaging method which can be implemented by general purpose processing system 308 or by a separate processing facility that receives the geophysical survey data from system 308. It begins in block 702 with the obtaining of geophysical survey data using multiple sources actuated with variable firing sequences as described above. In block 704, the system pre-processes the data to, e.g., suppress certain types of interference and to regularize the source and receiver positions associated with the signals. Such regularization can be accomplished by, e.g., interpolation to fill in for missing sensors and compensate for any misalignments. The output of this block is herein referred to as the "initial" receive signals.

In block 706, the system processes the initial receive signals to separate out the contributions of each source. These contributions are referred to herein as the wave fields for a given source, i.e., the wave field for the first source (aka the first source wave field) and the wave field for the second source (aka the second source wave field). In at least some systems, the sources are deployed at different depths in the water to enable de-ghosting of the wave fields in a later stage. The initial receive signals include the wave fields from each source and a residual component. In this block, the system forms an initial estimate of the source wave fields, then refines each estimate based on a combination of the previous estimate with the current residual component. This block will be described in more detail with reference to FIG. 8 below.

In block 708, the separated components are re-summed with appropriate firing time delays and compared with the initial receive signals. A close match indicates that the bulk of the receive signal energy has been associated with the source wave fields, whereas a mismatch indicates that a significant portion of the receive signal energy is not accounted for. In the latter case, block 706 is repeated with different settings until an adequate separation of the receive signal components is achieved.

In block 710, the separated wave fields for those systems having sources at different depths are combined in a manner that eliminates the source ghost (i.e., that portion of the signal attributable to the source energy reflecting from the water's surface). One suitable technique is described in M. Egan et al., "Full deghosting of OBC data with over/under source acquisition", 2007 Annual Meeting, San Antonio, Tex., Society of Exploration Geophysicists, but others exist and may be used. In block 712, the system further processes the de-ghosted wave fields to form images of the subsurface structure. In some embodiments, the system migrates the de-ghosted source downwards (e.g., with wave equation propagation) from the receiver positions to obtain reflected energy wave fields as a function of position and time. The reflected energy wave fields may then be combined with associated transmitted energy wave fields using a correlation function or some other imaging criterion that yields a volumetric map of the subsurface reflectivity. The reflectivity maps from different shots can then be stacked to yield an image of the subsurface structure. The system then makes a visual representation of the subsurface image accessible to a user, usually with tools that enable the user to interact with the visual representation so as to explore and analyze the subsurface image in detail.

FIG. 8 is a flowchart of an illustrative source wave field separation method that may be implemented by the system in block 706. In block 802, the system arranges the initial receive signals into a multi-shot gather domain, i.e., grouping the signals into gathers having signals acquired in response to different firing sequences. Suitable gather domains are those that enable the energy from a given source to be coherent when the firing times of that source are aligned while the energy from the other source(s) is rendered incoherent. Suitable gather domains include, without limitation, common midpoint gathers, common station gathers, and common channel gathers. The system then iterates through the gathers, carrying out the following operations for each gather.

In block 804, the system processes the signals in a manner that aligns the firing times of a first source, e.g., by time-shifting the received signals. Aligning the signals to the firing times of the first source in this manner causes the energy associated with that source to be coherent while the energy for the other sources is rendered incoherent. On this basis, the system applies a coherent/incoherent energy separation operation in block 806. Suitable techniques for doing this are known and they include, e.g., the methods disclosed by R. D. Martinez, "Weighted Slant Stack For Attenuating Seismic Noise", U.S. Pat. No. 6,574,567; P. Akerberg, et al., "Simultaneous source separation by sparse radon transform", 2008 Annual Meeting, Las Vegas, Nev., Society of Exploration Geophysicists; and S. Spitz, "Simultaneous source separation: a prediction-subtraction approach", 2008 Annual Meeting, Las Vegas, Nev., Society of Exploration Geophysicists. Prediction error filtering generates a filter model that minimizes a mean square error subject to constraints on the filter design, whereas the Radon transform approach condenses coherent energy into identifiable peaks in the phase-slowness domain. Such approaches to separating coherent energy components from incoherent energy components offer a relatively low computational complexity and may be preferred for this reason. Nevertheless other coherency screening operations could also be employed.

The coherent energy signals obtained in block 806 serve as an initial estimate of the first source wave field, this estimate being temporarily stored in block 814 for later use. In block 808, the system takes the incoherent energy signals and re-aligns them to synchronize the firing times of the second source. In block 810, the system again applies the coherent/incoherent energy separation operation. The coherent energy signals obtained here serve as an initial estimate of the second source wave field, this estimate being stored in block 816 for later use. In block 812, the system takes the incoherent energy signals from block 810 and re-aligns them to synchronize the firing times of the first source. These incoherent energy signals are added to the initial estimate of the first source wave field from block 814 to form what is herein termed "quieted" signals for the first source, i.e., a representation of the initial receive signals minus the estimated contribution from the second source.

Block 820 represents a group of operations 822-834 that may be performed repeatedly on the quieted signals for the first source with reference to the estimate for the second source wave field. In block 822, the system applies the coherent/incoherent energy separation operation to the quieted signals for the first source. The resulting coherent energy signals form a refined estimate of the first source wave field, and they are stored for future use in block 830. In block 824, the incoherent energy signals from block 822 are re-aligned to synchronize the firing times of the second source and added to the current estimate of the second source wave field to form quieted signals for the second source, in this case a representation of the initial receive signals minus the current estimate of the contribution from the first source. The system applies the coherent/incoherent energy separation operation again in block 826. The coherent energy signals form a refined estimate of the second source wave field and they are stored in block 832 for future use.

In block 828, the system re-aligns the incoherent energy signals from block 826 to synchronize the firing times of the first source. The re-aligned incoherent energy signals are added to the current estimate of the first source wave field from block 830 to form an improved version of the quieted signals for the first source. In block 834, the system tests the incoherent energy signals to determine whether the operations of block 820 should be repeated. The repetition may be deemed desirable if, e.g., the energy of the incoherent signals is falling relative to previous incoherent energy signals. Alternatively, if the energy of the incoherent energy signals is above a predetermined threshold, the repetition may be deemed desirable. Alternatively, the peak amplitudes of the incoherent energy signals may be used to make these determinations. As yet another alternative, a fixed or minimum number of repetitions may be deemed desirable. Once the system determines adequate estimates of the source wave fields have been obtained for each of the gathers, the process progresses to block 708 of FIG. 7.

If in block 708, it is deemed necessary to repeat block 706, the coherent/incoherent energy separation operations in FIG. 8 may be applied with different parameters to alter the proportion of energy that is found to be coherent to a given source. The repetition criterion in block 834 may also be altered to attempt a better convergence of the solution.

Because there is a certain asymmetry in the determination of source wave fields (i.e., whether the wave field for the first or second source is estimated first), contemplated alternative embodiments of the foregoing method will, after having determined and refined the estimated source wave fields, repeat the estimation process (blocks 804-834) with the sources being taken in a different order. The results of the two estimations may then be averaged to obtain unbiased estimates of the source wave fields.

The foregoing embodiments of a method for determining which components of a seismic signal are a result of a particular one of a plurality of geophysical sources can take the form of a computer program stored in a computer readable medium. The medium may be a volatile medium (such as an SRAM or DRAM computer memory) or a nonvolatile medium (such a magnetic disk, optical disk, or a flash memory chip). The program includes logic operable to cause a programmable computer to perform the operations explained above with respect to FIG. 7. The operations may be performed sequentially as explained above, but they may alternatively be performed in a pipelined or parallel fashion, and need not be performed strictly in the order described above. The method can be performed by a single processor, but it is contemplated that in most cases it would be performed by multiple processors in a localized or alternatively in a distributed computing fashion. The processor(s) employ one or more output devices (such as a printer or display screen) to make results perceptible to users so that they may monitor the process and evaluate the final product.

Numerous other modifications, equivalents, and alternatives, will become apparent to those skilled in the art once the above disclosure is fully appreciated. The foregoing disclosure can be applied, for example, to systems having two substantially-collocated sources at different depths, or systems having widely-separated sources. The techniques can also be applied to systems having more than two sources. It is intended that the following claims be interpreted to embrace all such modifications, equivalents, and alternatives where applicable.

What is claimed is:

1. A subsurface imaging method that comprises:
    obtaining initial signals from a geophysical survey acquired with multiple geophysical energy sources actuated in a plurality of firing sequences, each sequence having a known, different time delay between a seismic signal recording start time and a firing time of each source;
    forming gathers of the initial signals, each gather comprising signals acquired from multiple firing sequences; and
    for each gather:
        determining initial estimates of a first source wave field and a second source wave field;
        generating first source quieted signals representing the initial signals minus a current estimate of the second source wave field; and
        applying a coherent energy separation operation to obtain a refined estimate of the first source wave field from the first source quieted signals.

2. The method of claim 1, further comprising, for each gather:
    calculating second source quieted signals representing the initial signals minus the refined estimate of the first source wave field; and
    using the coherent energy separation operation to obtain a refined estimate of the second source wave field from the second source quieted signals.

3. The method of claim 1, further comprising deriving a subsurface image from refined estimates of the first and second source wave fields; and rendering the subsurface image in a perceptible form.

4. The method of claim 1, wherein the geophysical survey is a marine seismic survey, wherein the geophysical energy sources include two substantially collocated marine seismic sources at different depths, and wherein the method further comprises processing refined estimates of the component signals to separate up-going and down-going wave fields and to re-combine the up-going and down-going wave fields in a manner that suppresses ghosting.

5. The method of claim 1, wherein the coherency separation operation includes employing a prediction-subtraction procedure to separate spatially coherent signal energy from incoherent signal energy.

6. The method of claim 1, wherein the coherency separation operation includes transforming the signals into a domain where peaks represent spatially coherent signal energy and preferentially attenuating non-peak values in the transform domain.

7. The method of claim 2, further comprising repeating said generating, applying, calculating, and using steps to further refine estimates of the first and second source wave fields.

8. The method of claim 2, further comprising repeating said determining step with the sources taken in a different order, thereby obtaining additional estimates of the first and second source wave fields.

9. The method of claim 8, further comprising providing improved estimates of the first and second source wave fields by averaging source wave field estimates obtained by taking the sources in different orders.

10. The method of claim 1, wherein the forming gathers operation provides common station gathers or common midpoint gathers.

11. A subsurface imaging system that comprises:
    a computer readable medium having subsurface imaging software;
    one or more processors configured to execute the software, wherein the software configures the one or more processors to:
        obtain initial signals from a geophysical survey acquired with multiple geophysical energy sources actuated in a plurality of firing sequences, each sequence having a known, different time delay between a seismic signal recording start time and a firing time of each source;
        form gathers of the initial signals, each gather comprising signals acquired from multiple firing sequences; and
        for each gather:
            determine initial estimates of a first source wave field and a second source wave field;

generate first source quieted signals representing the initial signals minus a current estimate of the second source wave field; and apply a coherent energy separation operation to obtain a refined estimate of the first source wave field from the first source quieted signals.

12. The system of claim 11, wherein the software further configures the one or more processors to, for each gather:

calculate second source quieted signals representing the initial signals minus the refined estimate of the first source wave field; and use the coherent energy separation operation to obtain a refined estimate of the second source wave field from the second source quieted signals.

13. The system of claim 12, wherein the software further configures the one or more processors to derive a subsurface image from the refined estimates and to render the subsurface image in a form perceptible to a user.

14. The system of claim 11, wherein the software further configures the one or more processors to implement the coherent energy separation operation as a prediction-subtraction procedure to separate spatially coherent signal energy from incoherent signal energy.

15. The system of claim 11, wherein the software further configures the one or more processors to implement the coherent energy separation operation by transforming the quieted signals into a domain where peaks represent spatially coherent signal energy and by preferentially attenuating non-peak values in the transform domain.

16. The system of claim 12, wherein the software further configures the one or more processors to repeat the generate, apply, calculate, and use steps to further refine estimates of the first and second source wave fields.

17. The system of claim 16, wherein the software further configures the one or more processors to repeat the step of determining initial estimates with the sources taken in a different order, thereby obtaining additional refined estimates of the first and second source wave fields.

18. The system of claim 17, wherein the software further configures the one or more processors to provide improved estimates of the first and second source wave fields by averaging refined estimates of the first and second source wave fields obtained by taking the sources in different orders.

* * * * *